July 2, 1940.  D. B. WICKER  2,206,214
TESTING APPARATUS
Filed March 18, 1936

Inventor
Dan B. Wicker

Patented July 2, 1940

2,206,214

UNITED STATES PATENT OFFICE 2,206,214

TESTING APPARATUS

Dan B. Wicker, Appleton, Wis., assignor to The Institute of Paper Chemistry, Appleton, Wis., a corporation of Wisconsin Application March 18, 1936, Serial No. 69,461

8 Claims. (Cl. 88—14)

My invention relates to testing apparatus and particularly to apparatus for determining the relative transparency of light-transmitting materials such as waxed and glassine papers and similar transparent sheets.

The usefulness of glassine papers and the like is for many applications a direct function of the relative transparency of the material. Particularly is this true when the papers are being used for wrappings. It is necessary, therefore, to accurately ascertain the relative transparencies of such materials prior to marketing them. Transparency, however, is a relative term and is dependent upon a number of factors, at least one of which is psychological. As the term is defined in current dictionaries, transparency is the property possessed by certain materials of transmitting rays of light so that those materials can be distinctly seen through. There is, however, somewhat more to the subject of transparency than the definition would indicate, for the reason that the ability to see through paper, which property is in the case of glassine paper of greatest importance from the view point of its commercial value, is dependent not only upon the ability of the material to transmit light but upon its ability to transmit light without diffusion or dispersion.

One method heretofore used for determining the transparency of waxed and glassine papers consists in the placing of a test sheet in contact with a printed page, visually noting the relative sharpness of the letters through the paper, and then separating the sheet from the page and again noting the relative sharpness of the letters. Lastly, the paper is examined for uniformity. By a correlation of these three considerations, a measure of the transparency of paper is arrived at. Other and even less satisfactory methods of determining transparency are based generally upon the viewing of some objects through the sheet, i. e., the hairs on the forearm of the operator. Determinations by these methods are, at best, little more than estimates and are dependent entirely upon the judgment of the tester, a most variable quantity.

The principal object of the present invention is to provide a means for accurately ascertaining the transparency of materials of this type, which means shall be substantially independent of the opinion or judgment of the operator and which shall provide accurate results readily capable of standardization and duplication.

In arriving at my solution of this problem, I have found that the property of materials which makes for visual transparency is the ability of any particular material to transmit light rays therethrough without substantial deviation from their original direction, i. e., without substantial diffusion or dispersion. Thus it might be said that ideally the visual transparency of any material is a ratio equal to the division product of the energy of light transmitted without substantial deviation and the total energy incident upon a particular test sample. In developing a method of measuring visual transparency, I have found that an almost perfect index of visual transparency can be arrived at by the determination of a quantity or ratio which I have characterized as transparency ratio. This ratio is ascertained in the following manner: Through the use of suitable apparatus the intensity of a standard beam of light is measured. Next, the test sample is interposed in the standardized beam, and the amount of light energy transmitted through the sample without diffusion or refraction through more than a predetermined small angle is measured. The ratio of these values is a measure of the straight line transmittance of the sample and if a beam of parallel light is used the ratio might be termed the ratio of parallel transmittance. The sample is then so arranged in the apparatus that a measurement of the total light transmitted by the sample regardless of diffusion or refraction is obtained. The division product of this last measurement and the measurement of the total light energy incident upon the sample constitutes a ratio which I have termed the ratio of total transmittance. Transparency ratio is then obtained by dividing the ratio of straight line transmittance (or parallel transmittance) by the ratio of total transmittance. Usually it is expressed as a percentage. It will be seen that the transparency ratio might also be defined as the division product of the amount of light energy transmitted by the sample without diffusion or refraction through more than a predetermined small angle and the total amount of light energy transmitted by the sample regardless of diffusion or refraction.

While the ratio of straight line transmittance (or parallel transmittance) is the quantity most sensitive to differences in degree of transparency, and is in itself a very good index of the visual transparency of colorless materials, it is greatly influenced by chromatic absorption. Consequently, for colored materials, the ratio of straight line transmittance (or parallel transmittance) is not a perfect measure of visual transparency. For most accurate results with any material, the transparency ratio should be determined and for colored material, that ratio is the only satisfactory test. For production testing of colorless materials, the ratio of straight line transmittance (or parallel transmittance, if a parallel test beam is used) is usually a sufficiently accurate index.

The invention, therefore, in its simplest aspects consists of a means for readily measuring the total amount of light energy impressed upon a test sample, the amount of light energy which is transmitted through the sample without substantial diffusion or refraction, and the total amount of light energy transmitted through the sample whether diffused or not. Knowing these values, it is of course a simple matter to arrive at the transparency ratio of any material, which ratio, as has been mentioned in the foregoing, constitutes an almost perfect index to the relative visual transparency of any particular material. Due to the straight line sensitivity characteristics of photoelectric apparatus, I prefer to use such a device as the light energy measuring means.

Certain forms of the testing apparatus which have been found highly satisfactory for the determination of these values are illustrated in the attached sheet of drawings, wherein—

Figure 1:
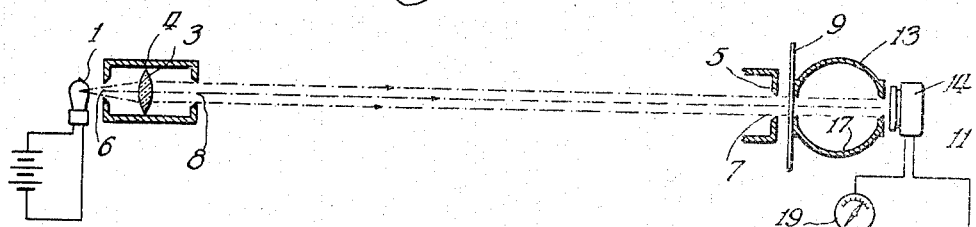
Fig. 1 is a schematic diagram of the preferred form of testing apparatus.

Referring particularly to the drawing, a light source is indicated at 1. This may comprise an automobile headlight bulb or similar means. A lens 3 which may have a focal length of approximately 50 mm. is focused upon the light source so as to produce a beam of parallel light. For best results the light beam is allowed to impinge upon a distant screen or target during the focusing operation. The lens 3 is preferably enclosed within a box-like closure 4 having light absorbing walls and suitable inlet and outlet openings 6 and 8. At a suitable distance from the lens is arranged a diaphragm 5 having a circular aperture 7, approximately one inch in diameter, formed therein. The sample 9 of paper or other material to be tested is disposed behind the diaphragm 5. In a plane substantially parallel to the plane of the test sample 9, there is positioned a suitable photo-electric light energy measuring device 11 of any well-known type. The blocking layer cell manufactured by the Weston Company is particularly suitable. The effective sensitive area of the photo-cell 14 forming a part of the light energy measuring means 11 is controlled by a diaphragm 12 having a circular aperture and is preferably of the same area as the opening in diaphragm 5, that is approximately one inch in diameter. Intermediate the photo-electric apparatus 11 and the sample 9, is a hollow, spherical closure 13 having two diametrically opposite, concentric, circular openings 15 also one inch in diameter formed therein. The interior surface 17 of this spherical closure 13 is arranged so as to be substantially light absorbing and for best results should not have a reflectivity in excess of one per cent. The diametrical axis of the spherical closure 13 whose ends terminate at the centers of the circular openings 15, is arranged normal to the plane of the test sample 9 and to the plane of the photo-electric element 14 of the light measuring means.

Under certain conditions, it is desirable to use a filter in the light beam in order to more clearly correlate the readings of the photo-electric apparatus with the sensitivity of the human eye. Such a filter is indicated at 18 in Fig. 2.

The distance separating the sample and the photo-electric cell is, in one satisfactory form of the apparatus, about 7½ inches and the diameter of the light absorbing sphere is slightly less than that value. The distance separating the test sample and the photo-electric cell may be expressed in terms of the diameter of the standardized light beam, or as the ratio between the actual linear separation of the sample and the photo cell and the diameter of the standardized light beam. For best results this ratio should not be substantially less than 7.5. While other ratios can be used, the distance separating the sample and the photo-electric cell must, in any event, be sufficient that substantially all of the light which is diffused by the sample through more than a very small angle shall be absorbed by the interior walls of the light absorbing closure 13 intermediate the sample 9 and the light measuring means 11.

Figure 2:
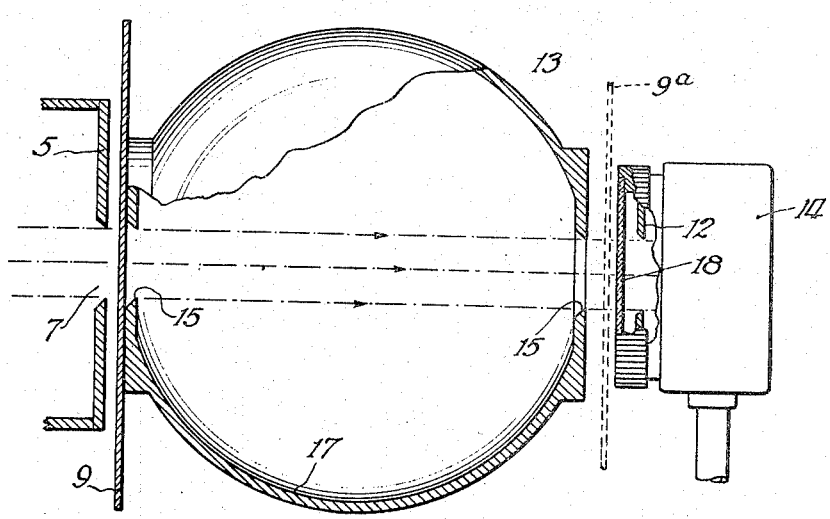
Fig. 2 is an enlarged schematic diagram of the measuring portion of the testing apparatus illustrated completely in Fig. 1.

The operation of the testing apparatus is substantially as follows: With the light source energized, the reading of the galvanometer 19 forming a part of the light measuring means 11 is adjusted, by means of a suitable resistance or the like, to a suitable reference point. For convenience, the reference point is ordinarily selected at 100 on the scale. The test sample is then introduced intermediate the light source 1 and the light measuring means 11, as shown in Figs. 1 and 2, and the reading then noted. This reading is indicative of the amount of light energy which is passed through the sample without substantial diffusion or other refraction and is a measure of the visual transparency of the material. Finally the sample is placed adjacent the photo cell 14 as is indicated at 9a and the reading of the galvanometer 19 is again noted. This reading constitutes a measure of the total light energy transmitted by the sample regardless of diffusion or refraction. From these three measurements the ratio of straight line transmittance (or parallel transmittance if a standardized beam of parallel light is used), the ratio of total transmittance and the transparency ratio, can readily be obtained. The galvanometer 19, may, of course, be of the recording type, this form being particularly desirable when the apparatus is used for continuously measuring and recording the light energy transmitted through a web of paper as it is manufactured in a papermaking machine.

Once the lens 3 has been properly focused upon the light source 1, it is possible to move the light measuring means 11 into relatively close proximity with the lens 3 without disturbing the parallel relation of the light beam. Thus, the complete testing apparatus may readily be built into a compact, unitary structure which is of a convenient size and is easily portable.

The measurement obtained when the test sample is positioned immediately adjacent the photo-electric element 14, as in the position indicated at 9a, when compared with the reading obtained when the test beam impinges directly upon the light sensitive surface of the cell 14, i. e. the ratio of total transmittance, is a measure of the translucency of the material being tested.

Figure 3:
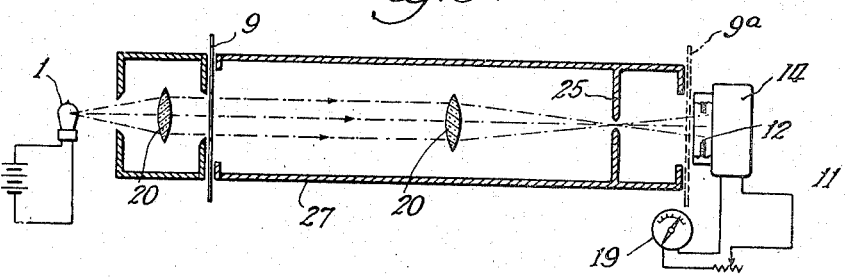
Fig. 3 is a schematic view of a modified form of the invention.

The modification illustrated in Fig. 3 operates in substantially the same manner as that just described. In this apparatus, however, the test sample 9, during the determination of the ratio of parallel transmittance, is placed intermediate the two lenses 20 utilized for securing the standardized test beam. The galvanometer reading obtained when the test sample is in the position 9 in this apparatus is likewise indicative of the amount of light energy which is transmitted through the sample without substantial diffusion or refraction. The diaphragm 25 effectively screens the photo-cell from all except the light transmitted through the sample without substantial diffusion, and the lens arrangement is enclosed within a suitable closure 27, the walls of which are light absorbing. The other position 9a and the reading obtained when the sample is in that position are similar to the position 9a and the corresponding reading in the previously described apparatus.

In both of the above described devices it will be noted that considerable care has been exercised to assure that the light measuring means shall be located a sufficient distance from the sample that the reading utilized for obtaining the ratio of straight line transmittance (or ratio of parallel transmittance when a parallel test beam is used), shall not be affected by the light diffused or otherwise refracted through more than a small angle during its passage through the sample. In other words, the ratio between the diameter of the light beam and the distance separating the sample and the photo cell is large. The elimination of the diffused light during the taking of one of the test readings is possibly one of the most important parts of the invention, for the reason that it makes possible the measurement of the amount of undiffused or non-refracted light transmitted by the sample, and hence makes possible the determination of the ratios of straight line transmittance (or parallel transmittance) and the transparency ratio.

Transparency ratio, as determined by the above described methods, constitutes an almost perfect index of the visual transparency of both colored and uncolored materials, for the reason that this ratio is not appreciably influenced by chromatic absorption. In the past, the determination of the visual transparency of colored materials has proven exceedingly difficult because of the illusory optical effects resulting from chromatic absorption. The ratio of straight line transmittance and the corresponding ratio of parallel transmittance, constitute easily determinable, accurate indices of the visual transparency of uncolored materials. The ratio of total transmittance is an accurate measure of the translucency of the test sample.

Thus it will be seen that I have disclosed a novel form of testing apparatus particularly suitable for determining the visual transparency of sheet material, such as glassine papers or the like. The apparatus is simple and gives exceedingly satisfactory results which are substantially free from operational error, and are capable of ready duplication and calibration.

It will be apparent to those skilled in the art that the apparatus of my invention readily lends itself to the continuous measurement and recording of the transparency of a web of paper as the web is made in a paper machine. When used in this manner the light source would be disposed on one side of the web and the measuring apparatus on the other. Thus it is my intention that the term "test sample" as used in the claims shall include portions of a roll or sheet of paper, or the entire web or sheet depending upon how the measuring apparatus may be used.

The basic principles of my invention are capable of embodiment into various types of apparatus.

I claim:

1. The method of measuring the relative visual transparency of a material which inherently causes substantial diffusion or dispersion of light transmitted therethrough, which consists in the steps of projecting a beam of light onto a light measuring means, measuring the intensity of said beam, introducing a test sample of the material into said beam of light whereby a substantial portion of the light constituting said beam will be substantially diffused or dispersed, separating the light which is substantially diffused or dispersed during its passage through said sample from the light which is transmitted through the sample without substantial diffusion or dispersion, measuring the intensity of the light which is transmitted through the sample without substantial diffusion or dispersion, and then obtaining the mathematical ratio of the said two intensity measurements.

2. The method of measuring the relative visual transparency of a material which inherently causes substantial diffusion or dispersion of light transmitted therethrough, which consists in the steps of projecting a concentrated beam of light onto a light energy measuring means, adjusting the reading of that means to a convenient reference point, introducing a test sample of the material into said beam of light whereby a substantial portion of the light constituting said beam will be substantially diffused or dispersed, separating the light which is substantially diffused or dispersed from the light which is transmitted through the sample without substantial diffusion or dispersion, directing only that portion of the light which is transmitted through the sample without substantial diffusion or dispersion onto said light energy measuring means, as so adjusted, again reading said measuring means and determining the ratio of said adjusted reading and the second reading.

3. The method of measuring the relative visual transparency of a material which inherently causes substantial diffusion or dispersion of light transmitted therethrough, which consists in the steps of projecting a beam of light onto a light measuring means, introducing a test sample of the material into said beam of light, separating the light which is substantially diffused or dispersed during its passage through said sample from the light which is transmitted through the sample without substantial diffusion or dispersion, measuring the intensity of the light which is transmitted through the sample without substantial diffusion or dispersion, measuring the intensity of the total light energy which is transmitted through the sample regardless of dispersion or diffusion, and then obtaining the ratio of the two measurements.

4. The method of measuring the relative visual transparency of a material which inherently causes substantial diffusion or dispersion of light transmitted therethrough, which consists in the steps of projecting a beam of light onto a light measuring means, introducing a test sample of the material into said beam of light, separating the light which is substantially diffused or dispersed during its passage through said sample from the light which is transmitted through the sample without substantial diffusion, measuring the intensity of the light which is transmitted through the sample without substantial diffusion or dispersion, measuring the intensity of the total light energy which is transmitted through the sample regardless of dispersion or diffusion, and then dividing the first named measurement by the last named measurement.

5. In apparatus for determining the relative visual transparency of partially or semi-transparent materials, a light energy measuring means, means for projecting a concentrated beam of light toward and upon said measuring means, two, spaced, test sample positioning means which define two, spaced, test sample measuring positions intermediate said light projecting means and said light measuring means, one of said test sample positioning means and the measuring position which it defines being adjacent said light measuring means, the other test sample positioning means and the measuring position which it defines being spaced some distance from said light measuring means, and means located intermediate said spaced test sample positioning means for preventing substantially all of the light which is substantially diffused or dispersed during its passage through a sample positioned in said spaced measuring position from reaching said light measuring means, said light measuring means being operative to measure substantially all of the light energy transmitted through the sample when the sample is located in the measuring position adjacent said measuring means.

6. In apparatus for determining the relative visual transparency of partially or semi-transparent materials, a light energy measuring means which includes a photocell, means for projecting a beam of parallel light toward and upon said photocell, two, spaced, test sample positioning means which define two, spaced, test sample measuring positions intermediate said light projecting means and said photocell, one of said test sample positioning means and the measuring position which it defines being adjacent said photocell, the other test sample positioning means and the measuring position which it defines being spaced some distance from said light measuring means, and means located intermediate said spaced test sample positioning means for preventing substantially all of the light which is substantially diffused or dispersed during its passage through a sample positioned in said spaced measuring position from reaching said photocell, said light measuring means being operative to measure substantially all of the light energy transmitted through the sample when the sample is located in the measuring position adjacent said measuring means.

7. In apparatus for determining the relative visual transparency of partially or semi-transparent materials, a light energy measuring means which includes a photocell, means spaced a substantial distance from said light measuring means for projecting a concentrated beam of light towards and upon said photocell, two, spaced, test sample positioning means which define two, spaced, test sample measuring positions intermediate said light projecting means and said photocell, one of said test sample positioning means and the measuring position which it defines being adjacent said photocell, the other test sample positioning means and the measuring position which it defines being spaced some distance from said photocell, means located intermediate said spaced test sample positioning means for preventing substantially all of the light which is substantially diffused or dispersed during its passage through a sample positioned in said spaced measuring position from reaching said photocell, said light measuring means being operative to measure substantially all of the light energy transmitted through the sample when the sample is placed in the measuring position adjacent said photocell, and means for excluding extraneous light from said photocell during the use of said apparatus.

8. In apparatus for determining the relative visual transparency of partially or semi-transparent materials, a light energy measuring means, means spaced a substantial distance from said measuring means for projecting a beam of light which is at least approximately circular in cross-section toward and upon said measuring means, two, spaced, test sample positioning means which define two, spaced, test sample measuring positions intermediate said light projecting means and said light measuring means, one of said test sample positioning means and the measuring position which it defines being adjacent said light measuring means, the other test sample positioning means and the measuring position which it defines being spaced from said light measuring means a distance equal to at least about 7.5 times the diameter of said light beam, and means located intermediate said spaced, test sample positioning means for preventing substantially all of the light which is substantially diffused or dispersed during its passage through a sample positioned in said spaced measuring position from reaching said light measuring means, said light measuring means being operative to measure substantially all of the light energy transmitted through the sample when the sample is located in the measuring position adjacent said measuring means.

DAN B. WICKER.